US008397677B2

(12) United States Patent
Bruer et al.

(10) Patent No.: US 8,397,677 B2
(45) Date of Patent: Mar. 19, 2013

(54) THERMAL CONDUCTIVE COOLING METHOD AND SYSTEM FOR LIVESTOCK FARM OPERATIONS

(75) Inventors: James C. Bruer, Chandler, AZ (US); William Timothy Steele, Chandler, AZ (US)

(73) Assignee: Conco Technology, Inc., Chandler, AZ (US)

( * ) Notice: Subject to any disclaimer, the term of this patent is extended or adjusted under 35 U.S.C. 154(b) by 0 days.

(21) Appl. No.: 13/161,047

(22) Filed: Jun. 15, 2011

(65) Prior Publication Data
US 2011/0283952 A1 Nov. 24, 2011

Related U.S. Application Data (60) Provisional application No. 61/370,860, filed on Aug. 5, 2010.

(51) Int. Cl.
*A01K 1/00* (2006.01)

(52) U.S. Cl. .......................................... 119/448; 199/526

(58) Field of Classification Search .................. 119/448, 119/525, 526, 528, 28.5, 436, 480, 509; 5/421, 5/422, 423, 284; 62/261; 165/53
See application file for complete search history.

(56) References Cited

U.S. PATENT DOCUMENTS

| 2,110,022 | A | * | 3/1938 | Kliesrath | 62/261 |
| 2,753,435 | A | * | 7/1956 | Jepson | 126/204 |
| 3,225,739 | A | | 12/1965 | Brodrick | |
| 3,360,032 | A | * | 12/1967 | Sherwood | 165/264 |
| 3,677,229 | A | | 7/1972 | Blough et al. | |
| 3,809,014 | A | * | 5/1974 | Jones et al. | 119/508 |
| 3,815,550 | A | * | 6/1974 | Becker | 119/508 |
| 3,826,230 | A | | 7/1974 | Jones et al. | |
| 4,217,859 | A | * | 8/1980 | Herring | 119/508 |
| 4,252,082 | A | | 2/1981 | Herring | |
| 4,332,214 | A | * | 6/1982 | Cunningham | 119/28.5 |
| 4,706,883 | A | | 11/1987 | Fleischmann | |
| 5,092,271 | A | * | 3/1992 | Kleinsasser | 119/508 |
| 5,170,935 | A | * | 12/1992 | Federspiel et al. | 236/44 C |

(Continued)

FOREIGN PATENT DOCUMENTS

| CN | 2797495 | 7/2006 |
| CN | 201682860 | 12/2010 |

(Continued)

OTHER PUBLICATIONS

International Search Report and Written Opinion dated Dec. 14, 2011 from related PCT application.

(Continued)

*Primary Examiner* — Rob Swiatek
*Assistant Examiner* — Ebony Evans
(74) *Attorney, Agent, or Firm* — James C. Nemmers; Shuttleworth & Ingersoll, PLC (57) ABSTRACT

A system and method for the conductive cooling and warming of livestock. Heat exchangers are positioned beneath the cushion bedding areas of the animal so as to utilize on-site water, either in a single pass or a re-circulating system. In a single pass system the on-site water supply is diverted to the heat exchangers below the animal cushion bedding before returning to its original use for purposes such as drinking, wash down, or other processes. With the re-circulating system, a separate heat exchanger is located between the on-site water and the re-circulating water to the cushion bedding areas so as to exchange heat transferred from the animal lying on the cushion bedding above the heat exchanger.

24 Claims, 11 Drawing Sheets

U.S. PATENT DOCUMENTS

| | | | | |
|---|---|---|---|---|
| 5,448,788 | A * | 9/1995 | Wu | 5/421 |
| 5,871,151 | A * | 2/1999 | Fiedrich | 237/69 |
| 5,894,615 | A * | 4/1999 | Alexander | 5/421 |
| 6,095,235 | A | 8/2000 | Kongsgaard | |
| 6,581,224 | B2 * | 6/2003 | Yoon | 5/421 |
| 6,675,739 | B2 * | 1/2004 | Terrell et al. | 119/448 |
| 7,165,509 | B2 * | 1/2007 | Bryant | 119/446 |
| 7,547,364 | B2 | 6/2009 | Polak | |
| 7,877,827 | B2 | 2/2011 | Marquette et al. | |
| 7,880,121 | B2 * | 2/2011 | Naylor | 219/213 |
| 8,011,204 | B2 * | 9/2011 | Kissel, Jr. | 62/434 |
| 2003/0159457 | A1 | 8/2003 | Faqih | |
| 2003/0229385 | A1 * | 12/2003 | Elkins | 607/104 |
| 2004/0144110 | A1 | 7/2004 | Reeves et al. | |
| 2008/0148481 | A1 | 6/2008 | Brykalski et al. | |

FOREIGN PATENT DOCUMENTS

| | | |
|---|---|---|
| DE | 9306009 | 8/1993 |
| DE | 19609153 | 9/1997 |
| DE | 19947349 | 4/2001 |
| DE | 20111803 | 2/2002 |
| EP | 0841004 | 5/1998 |
| EP | 0960309 | 12/1999 |
| EP | 1009222 | 6/2000 |
| EP | 1803347 | 7/2007 |
| FR | 2672966 | 8/1992 |
| JP | 2004173667 | 6/2004 |
| JP | 2006121923 | 5/2006 |
| RU | 2166247 | 5/2001 |
| RU | 69703 | 1/2008 |
| SE | 0400297 | 8/2005 |
| WO | 99/09811 | 3/1999 |
| WO | 2010051944 | 5/2010 |

OTHER PUBLICATIONS

K.R. Bastian, K.G. Gebremedhin, N. R. Scott, A Finite Difference Model to Determine Conduction Heat Loss to a Water-Filled Mattress for Dairy Cows, Article from American Society of Agricultural Engineers ISSN 0001-2351, Transactions of the ASAE, vol. 46(3), pp. 773-780, 2003.

* cited by examiner

THERMAL CONDUCTIVE COOLING METHOD AND SYSTEM FOR LIVESTOCK FARM OPERATIONS

This application claims priority under 35 USC 119 to Provisional Patent Application Ser. No. 61/370,860 filed on Aug. 5, 2010, the contents of which are hereby incorporated by reference.

TECHNICAL FIELD

The present invention relates generally to cooling devices, and more specifically to a conductive cooling system. The present invention is particularly suitable for, although not strictly limited to, the efficient conductive cooling of dairy animals in free stall, Saudi style, pen-tied, and open lot agricultural housing structures whereby a relatively thick layer of inorganic or organic material is required as a bedding cushion for the animals.

BACKGROUND OF THE INVENTION

Cows, as well as other animals, are naturally cooled by evaporation, radiation, respiration, convection, and conduction. Dairy cows, in particular, attempt to maintain desired core temperatures through the processes of evaporation (skin), respiration (breathing), radiation (emittance), convection (transfer of thermal energy by air movement), and conduction (contact between surfaces where one surface has a higher thermal energy level than the other surface).

Evaporation as a means to release excess thermal energy is dramatically limited by the surrounding humidity. When humidity levels are high, there is little range for evaporation of water, whether excreted through the skin, on the tongue, or from application of water to the animal, i.e. soaker and misting systems that apply water on the animal and which are commonly used in most dairy operations. Under conditions of humidity saturation, there can be no effective evaporation.

Respiration can expel thermal energy via the elevated temperature of the exhaled air and its moisture. However, under conditions of high temperature, the inhaled air can actually increase the heat intake of the animal (air over critical core temperature of 101.5° F. to 103° F.). Again, in a near or saturated humidity condition, the benefit of evaporation in conjunction with the breathing is severely limited from the animal's lungs.

Radiation as a means to expel excessive core heat is limited in conditions where the cow is either confined full-time or the cow is outside where there is typically not a clear night sky for energy to radiate from the animal to a body of lower energy. In fact, in many animal confinement structures the major radiation that occurs is from the daytime higher temperature of the underside of the roof to a cooler surface, the animal. This is illustrated by metal roofing for a dairy barn that can easily reach 160° F. in summer periods, while the dairy cows in question have a lower energy level of the normal skin temperature of approximately 99° F. This means the cows are receptors of energy, not emitters. Clouds and high humidity, as well as being indoors, can severely limit any ability for a cow to radiate energy.

Convection, or cooling by air movement over the animals, is limited by the temperature of the moving air, the animal in question, grouping of the animals, distance from the air movement equipment, and other internal building design constraints. If the air is at or above the desired surface skin temperature, there is no beneficial direct energy transfer. Close crowding of animals defeats convection transfer, i.e. no air movement over the higher thermal energy surface, means no transfer. In fact, still air has an assigned insulating or thermal resistance value (R-Value).

In most dairy operations, cows are housed in confinement structures called 'free stall barns'. In geographical areas where the average air temperatures are high, these barns are typically open on the sides and ends to provide for air circulation. However, during periods of high temperature and/or humidity, the cooling effects on the animals through evaporation, radiation, respiration, and convection are severely limited.

As is well known to those in the industry, the most common method used in dairy operations to abate the effects of heat stress on their animals is to install fans to circulate air as well as water soaking and/or misting systems. Current evaporative and convective systems (fans or other air movement means) for the auxiliary cooling of confined animals have severe limitations due to the effects of the local wet bulb temperature, ambient temperature, and the ability for artificial convective cooling to supplement the natural processes of the subject animal.

Moreover, utilizing fans and misting to cool dairy cows and other confined animals during the summer months places a large demand for electricity during the peak operational hours on the power grid, as well as placing a large demand on the water source for the various soaking and misting system operations. The associated high energy costs and high water usage of this type of animal cooling, which in some states is becoming cost-prohibitive, has resulted in an urgent need for an alternative method of cooling livestock during weather above the desired ambient temperature (68° F. for cows). Additionally, conventional cooling has severe limitations to the available heat transfer pathways used by animals.

Moreover, conventional cooling methods for dairy cattle utilizing fans and misting/soaking during the summer months cause inherent health problems with the cattle. A wide range of research has proven that as a direct result of misting and soaking for cattle cooling purposes, the incidence of mastitis and lameness of dairy cattle significantly increases during the summer months. This results in lost milk production and/or involuntary culling of problematic cattle resulting in a significant financial loss. The economic consequences to dairy producers from heat stress conditions can be lost milk production, poor reproductive performance, and increased health problems. Therefore, there is a need for an improved means of cooling livestock in animal farm operations that significantly reduces these associated health problems as a direct result of the conventional cooling methods currently in use Moreover, in areas with severe cold weather conditions, there is a significant requirement and desire to be able to provide supplemental heat to the animal to maintain food-to-output ratios in a profitable range. Excessive cold conditions lead to physical impacts to dairy cows, including freezing of teats, that leads to severe losses in milk production as well as overall health. Although there are known systems for providing supplemental heat to animal confinement facilities, this invention provides a simple supplemental heating and cooling system.

SUMMARY OF THE INVENTION

Conduction is the only means of cooling available to the animal that is not directly affected by surrounding air temperature, humidity, or air movement. It is strictly a function of the surface area of the contact patch between the animal and cooled surface or bed, the conductance between the two surfaces (U-Value), and the temperature difference between the two surfaces.

Conduction cooling of an animal is available and can become the dominant means for the animal to maintain its required core body temperature to avoid stress conditions leading to lost milk or meat production, reduced reproduction, poor food intake, increased health problems, and even death. The use of conduction cooling for mitigation of core body temperature in livestock can greatly reduce both electricity and water consumption, compared to conventional systems, by supplying all or a significant portion of the required animal cooling. The cooling capacity of local groundwater is currently an unused feature of the normal, operational, well water supply of the typical farm operation. The utilization of this groundwater, or water/fluids cooled by other means, can be employed as the heat exchange medium for conduction cooling of the animals.

In the system of the invention, low-cost plastic based heat exchangers are positioned beneath the cushion bedding areas of the animal so as to utilize this on-site water, either in a single pass or a re-circulating system. In a single pass system the on-site water supply is diverted to the heat exchangers below the animal cushion bedding before returning to its original use for purposes such as drinking, wash down, or other processes. With the re-circulating system, a separate heat exchanger is located between the on-site (well) water and the re-circulating water to the cushion bedding areas so as to exchange heat transferred from the animal lying on the cushion bedding above the heat exchanger. The invention specifically allows the use of the typical, soft bedding materials utilized throughout the dairy industry where it has been established that dairy operators do not employ hard surfaces for bedding areas because of pressure point injury to the animal. The use of soft bedding materials to serve as a cushion is mandated by behavioral patterns of a cow that cause the animal to shun hard surfaces in favor of soft surfaces that mimic nature. The temperature differential between the normal on-site well water temperature (for example, 60° F.-65° F. for central California valley areas) and the ambient peak temperature during the summer months (typically at or above 104° F. for the same California valley areas) allows for a large amount of BTU removal from the animal in order to maintain the desired core body temperature of the animal. The use of mechanically chilled water in a re-circulating system allows any desired temperature to be supplied to the heat exchanger beneath the cushion bedding. Additionally, a boiler can be used in the re-circulating system designs for the purpose of providing a heated bedding area. Moreover, in the present invention, the capacity to provide supplemental heating is greatly simplified due to the use of the majority of the cooling equipment for provision of heating in cold, winter periods.

DETAILED DESCRIPTION OF THE PREFERRED EMBODIMENTS OF THE INVENTION

Figure 1:
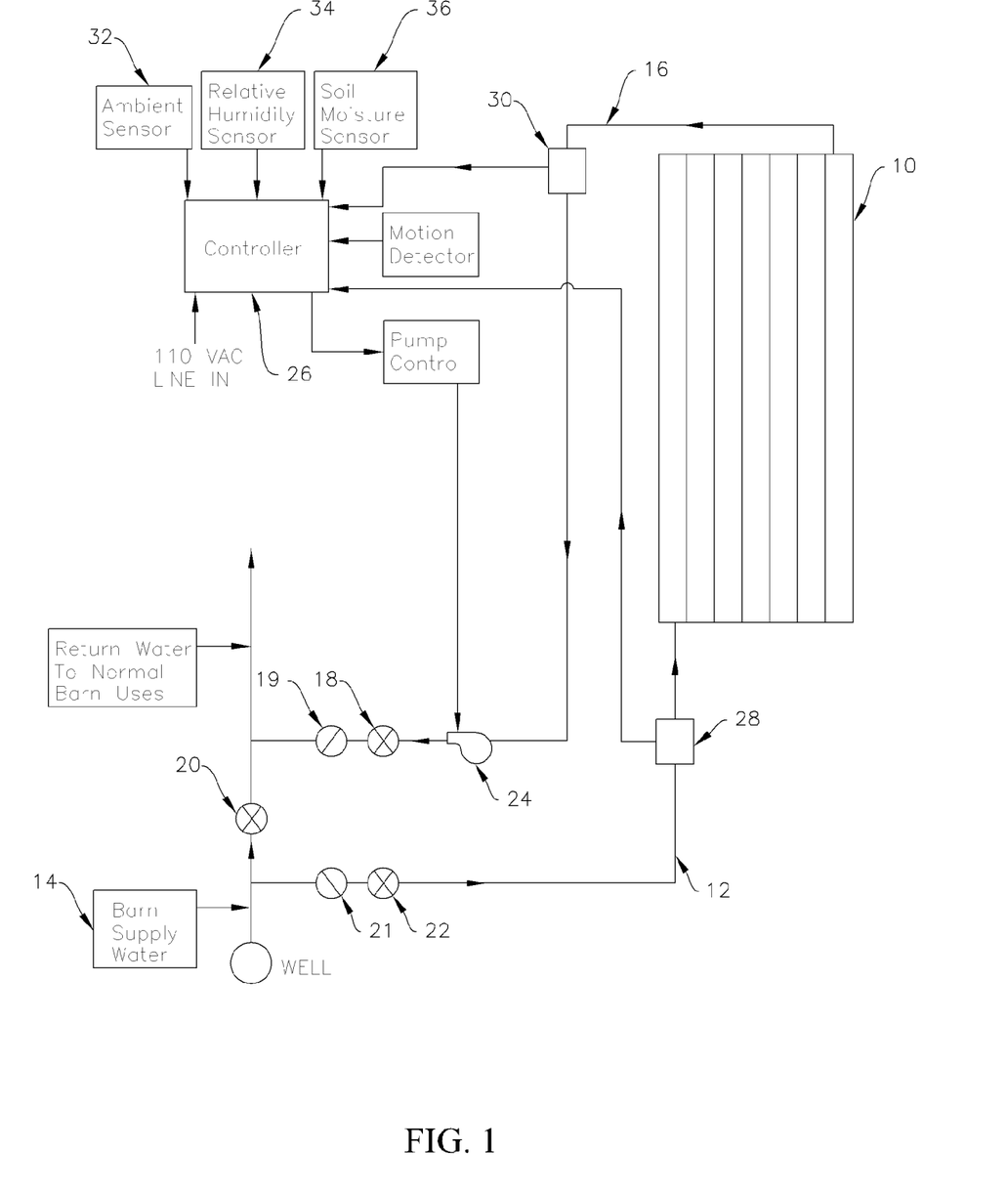
FIG. 1 is an operational flow chart and schematic of the cooling system of the invention using a single-pass type with full control features.
Figure 5:
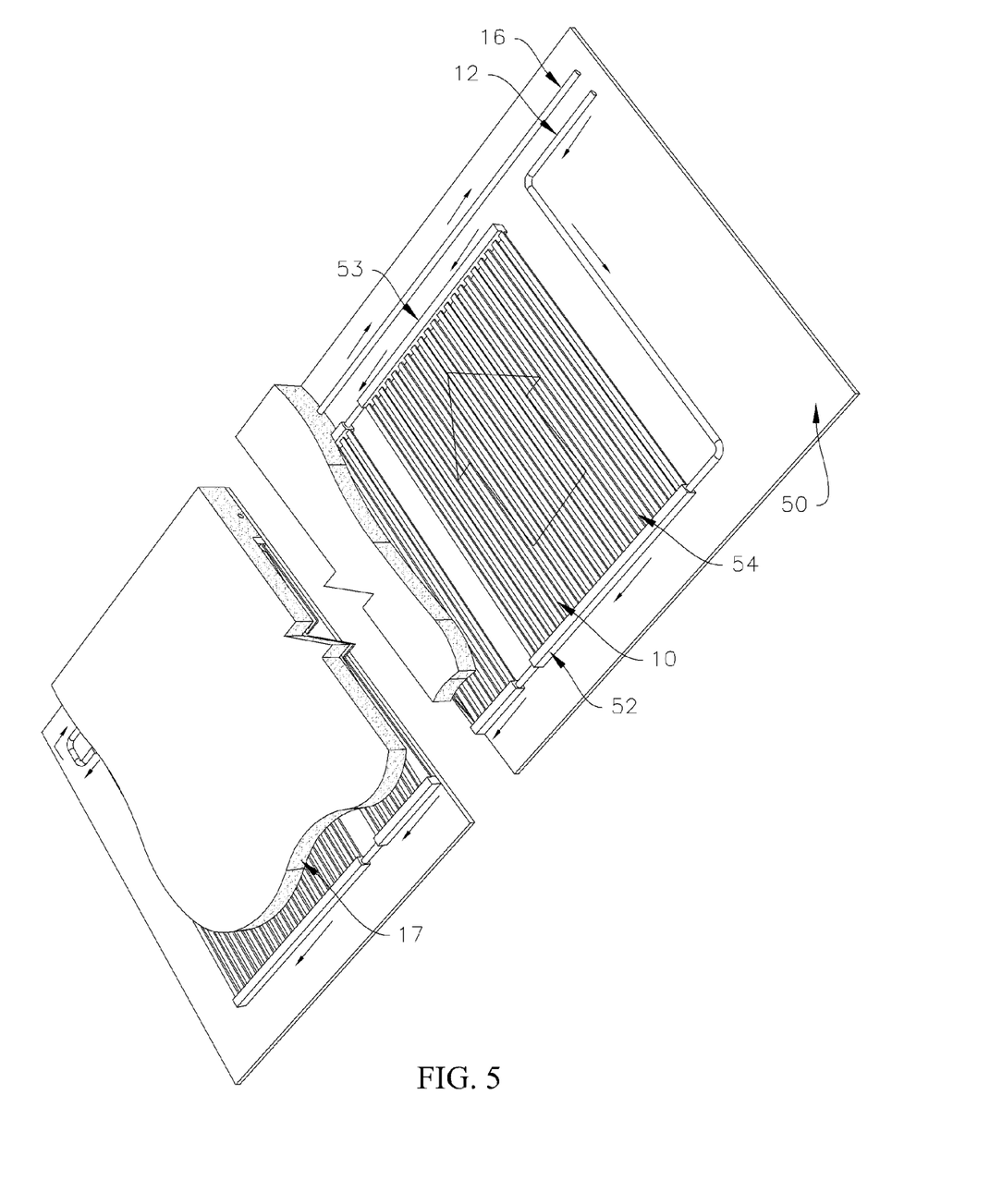
FIG. 5 is a perspective view showing a typical heat exchanger of the type useable with the systems of the invention, showing the placement of the heat exchanger beneath the bedding area of the animals.

Referring to the accompanying operational flow chart and schematic of FIG. 1, a heat exchanger 10 is installed beneath each of the bedding areas 17 (see FIG. 5) of an enclosure that houses the animals in a dairy farm operation. The heat exchanger 10 is of any suitable design through which a cooling or heating liquid can flow to provide for the efficient transfer of heat between the heat exchanger and an animal laying on the layer of bedding material, which is typically made up of any suitable material used for bedding in animal housing structures or barns. A suitable heat exchanger 10 is illustrated in FIG. 5 and described hereinafter. Although only a single heat exchanger is illustrated in the schematic of FIG. 1, it will be understood that there would be as many heat exchangers in the system as needed for the bedding areas in the animal enclosure. Depending upon the animal and the application, each heat exchanger can have multiple orientations within the bedding areas of the animal enclosure.

In most dairy operations, water supply lines are already in place from an existing water source, such as a well, to the dairy barns in order to supply the soaker lines and/or misting systems, water troughs and the milking parlor for the wash pen and milking equipment. Each heat exchanger 10 is connected in the manifold plumbed system in which water is supplied to the heat exchanger 10 through a supply line 12 from the water source 14 such as an existing well or other barn supply water system normally used in the farm operation. Alternately, for the single-pass system illustrated in FIG. 1, a dedicated supply line may be used. After passing through the heat exchanger 10, the water is then returned through a return line 16 to the existing piping system for the water source 14 and may be used for its original intended purpose, such as livestock watering, wash-down, or other normal operational uses. Diverter valves 18, 20 and 22 are included in the system and used as necessary to control the flow of water to and from the heat exchanger 10 and recirculate the water back to the heat exchanger 10 or use it for normal barn uses. During normal cooling operation, valve 20 is either closed or partially open, to force water through valves 22 and 18 which will be open. Check valve 19 is used in return line 16 downstream from valve 18 to prevent back-flow of water moving through valve 20 from entering the return line 16 toward valve 18 when valve 20 is open. The main function of valves 18 and 22 are to act as isolation valves for maintenance of the heat exchanger 10 or cow bedding areas 17. Check valve 21 in line 12 will prevent backflow through valve 22. If needed, a booster pump 24 can be included to overcome static piping losses. The most basic system would utilize manual control valves for operation, and thus valves 18, 20 and 22 can be either manual valves of various types or motorized if used under operation by an intelligent controller 26. If booster pump 24 is used, it is also controlled by a control system in which all control functions are accomplished by the use of the intelligent controller 26.

Figure 4:
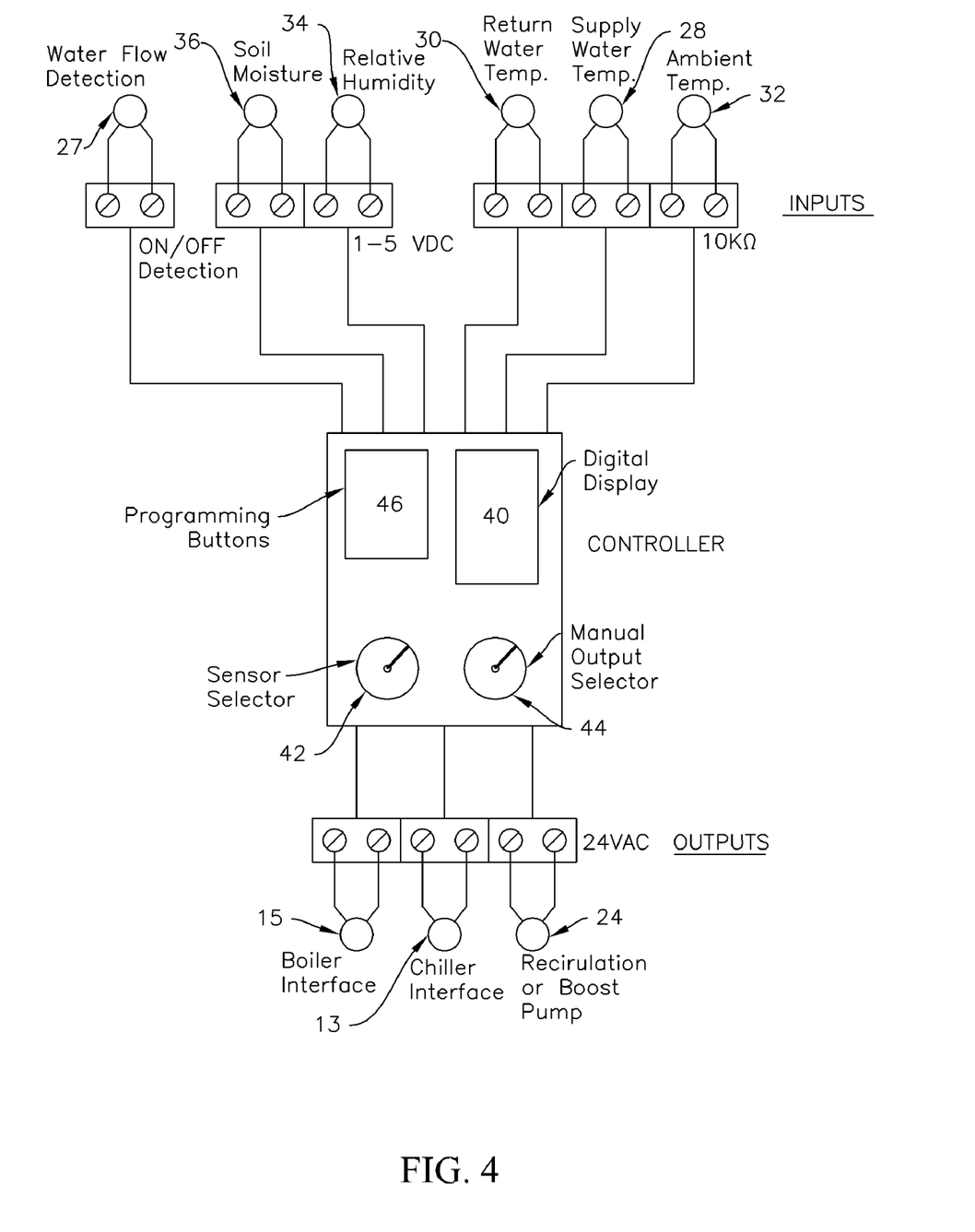
FIG. 4 is a schematic diagram of the controller of the cooling/heating systems of the various embodiments of the invention.

Multiple sensors are utilized to provide information to the controller 26. As illustrated in the schematic of FIG. 4, a suitable sensor 28 continually senses the temperature of the water flowing to heat exchanger 10 through supply line 12, and a sensor 30 continually senses the temperature of the water flowing from the heat exchanger 10 through return line 16. Suitable sensors 32 and 34 continuously monitor the ambient air temperature and relative humidity in the confinement building.

A soil moisture sensor 36 is located a few inches beneath the livestock bedding area and above the heat exchanger 10 to monitor the soil moisture and thereby enhance thermal conductivity as well as detect leaks in the system. If suspected leaks are detected, the controller 26 may include an alarm that can activate a visual warning light (not shown) and/or provide data updates to the operator. Using the information supplied to it from these various sensors, the controller 26 will compare the cooling requirements, weather conditions, water temperatures, time of day, and animal condition to control pumps and/or the flow of water to and from the heat exchanger 10 and thus optimize water usage and/or energy by controlling the water diverter valves 18, 20 and 22, and pump 24, if used.

In some applications, the heat exchanger 10 can be designed to be a part of a re-circulating closed loop system that may utilize a conventional water chiller 13 to provide the desired water temperature through the heat exchanger 10 where desired or required by the local conditions. Such a re-circulating closed-loop system can also be used to circulate warm water through heat exchanger(s) 10 during cold weather periods from a boiler 15. This would be very applicable for dairies located in cold weather states to improve feed efficiency during the winter.

Figure 2:
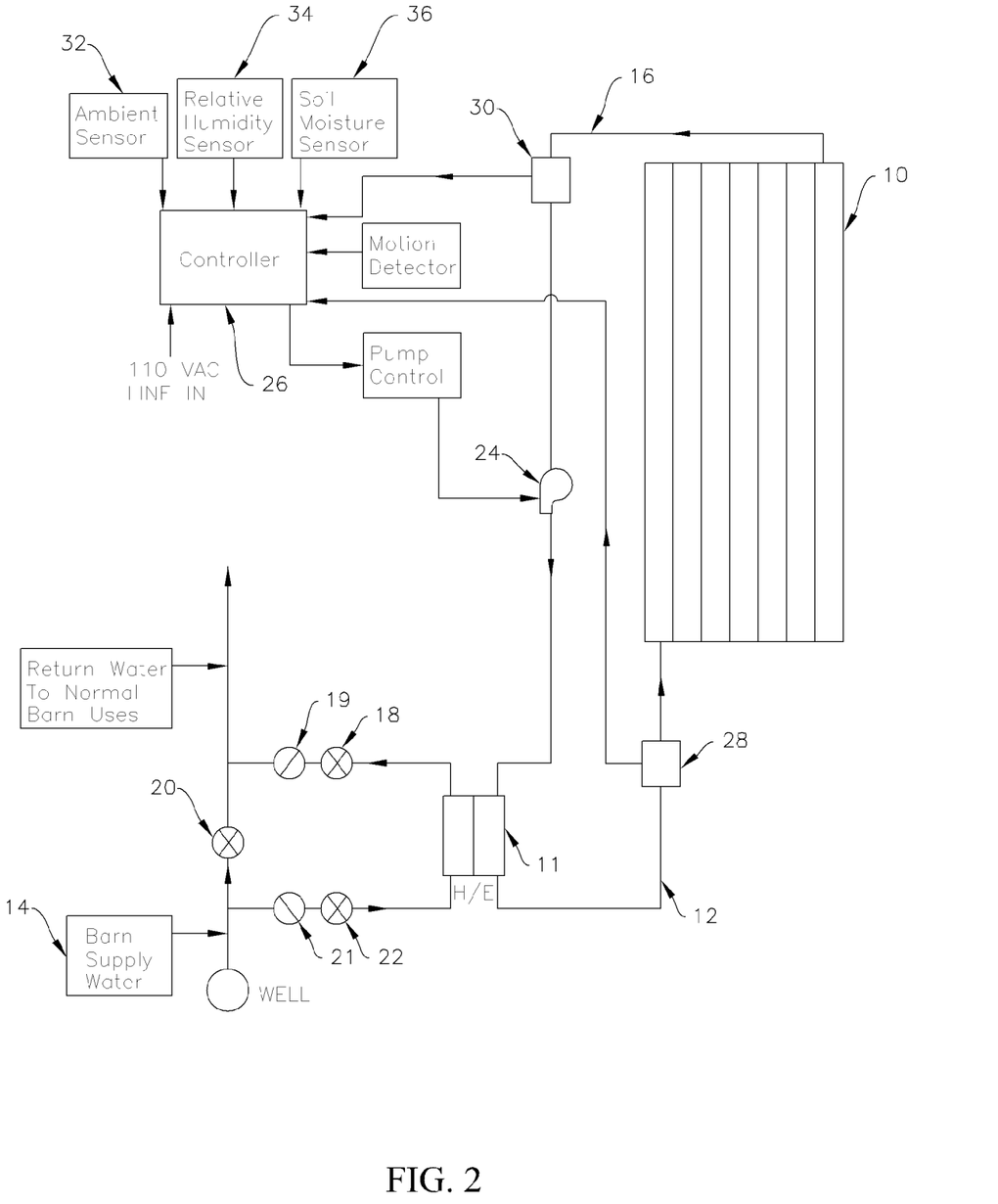
FIG. 2 is an operational flow chart and schematic of another embodiment of the cooling system of the invention illustrating a closed-loop system utilizing a heat exchanger between the well water and the re-circulating water that is plumbed to the heat exchangers beneath the bedding with full control features.

The embodiment of FIG. 2 illustrates such a closed-loop system. Similar to the single-pass system of FIG. 1, a heat exchanger 10 located in the animal bedding areas is connected in the manifold plumbed system in which water is supplied to the heat exchanger 10 through a supply line 12. A conventional liquid to liquid heat exchanger 11 is installed between the supply water 14 and the re-circulating system consisting of line 12 and the return line 16. Such a heat exchanger 11 can be of any suitable design well known to those skilled in the art. Thus, the temperature of the water from the water supply 14 can be used to cool or warm to a desired temperature the supply water 12 before entering the heat exchanger 10. After passing through the heat exchanger 11 the water is then returned to the existing piping system for the water source 14 where is can be used for its original intended purpose, such as livestock watering, wash-down, or other normal operational uses. As in the single-pass system of FIG. 1, diverter valves 18, 20 and 22 and check valves 19 and 21 are included in the system and used as necessary to control the flow of water to and from the heat exchanger 11. As in the first embodiment, if needed, a booster pump 24 can be included to overcome static piping losses, and if a booster pump 24 is used, it is controlled by the controller 26.

Figure 3:
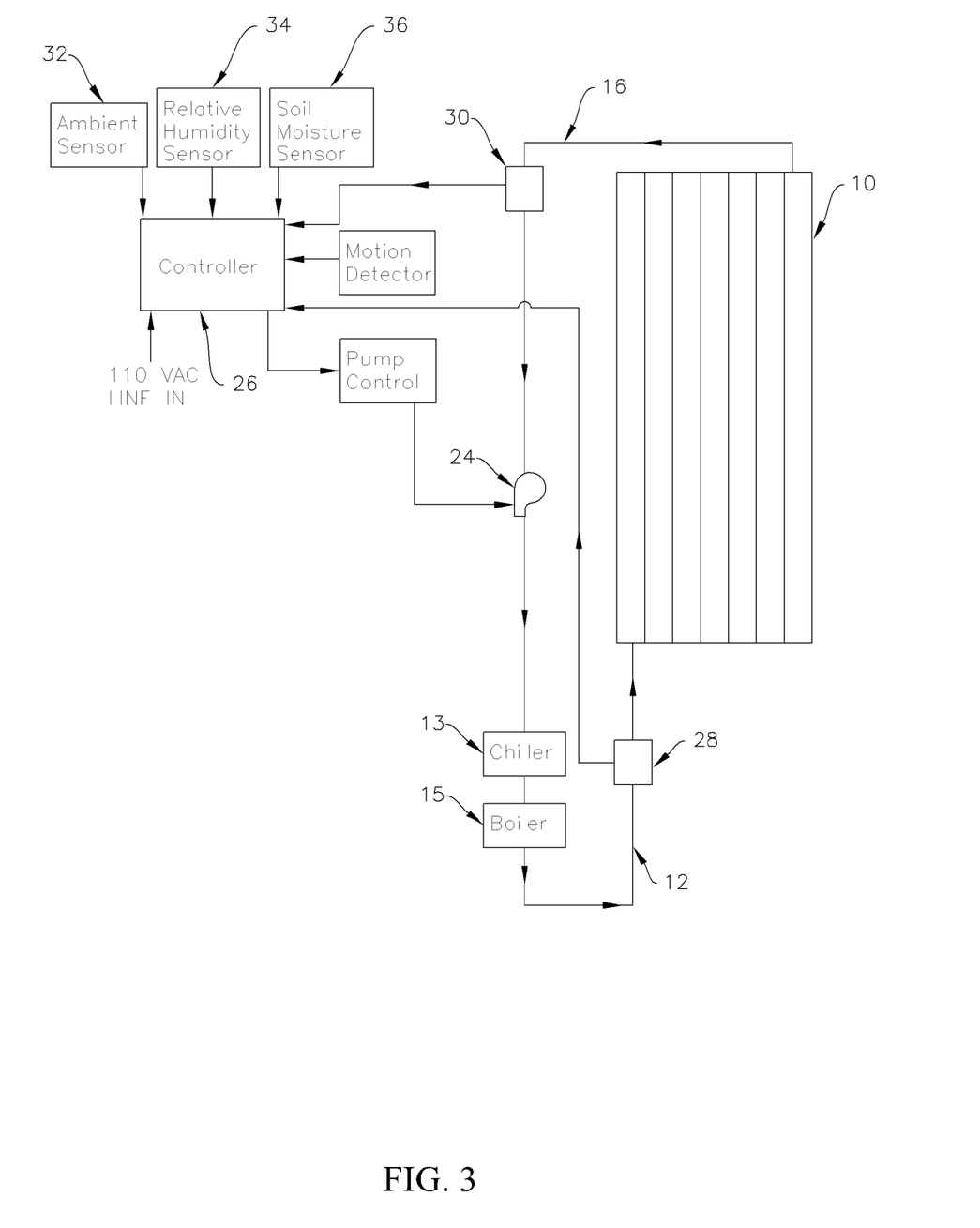
FIG. 3 is an operational flow chart and schematic of yet another embodiment of the cooling system of the invention illustrating a closed-loop system utilizing a chiller and/or a boiler connected, in series, to a re-circulating type heat exchanger beneath the bedding with full control features.

FIG. 3 illustrates a fully closed loop system in which the water utilized in the heat exchanger 10 is heated or cooled and re-circulated and not under any conditions returned to a supply source. In this fully closed-loop system of FIG. 3, water enters the heat exchanger 10 through a supply line 12 and is discharged through a return line 16 and returned to the supply line 12. A cooler, such as chiller 13, and/or a heater, such as boiler 15, are placed in the return line 16 to the heat exchanger 10 to either cool or heat the water to a desired temperature. The chiller 13 and boiler 15 can be of any suitable design well known to those skilled in the art. Thus, the temperature of the water entering the heat exchanger 10 can be regulated by cooling or warming to a desired temperature before entering the heat exchanger 10. Since the system of FIG. 3 is a completely closed-loop system, there is no necessity of any diverter valves like those included in the systems of FIGS. 1 and 2. A re-circulation pump 24 is controlled by the controller 26.

The design of the systems of FIGS. 2 and 3 allows for installation where the reuse of water from a single-pass system is either impossible or impractical.

In each of the systems of FIG. 1, 2 or 3, multiple sensors are utilized to provide information to the controller 26. As illustrated in the schematic of FIG. 4, a suitable sensor 28 continually senses the temperature of the water flowing to heat exchanger 10 through supply line 12, and a sensor 30 continually senses the temperature of the water flowing from the heat exchanger 10 through return line 16. Suitable sensors 32 and 34 continuously monitor the ambient air temperature and relative humidity in the confinement building. A soil moisture sensor 36 is located a few inches beneath the livestock bedding area and above the heat exchanger 10 to monitor the soil moisture and thereby enhance thermal conductivity as well as detect leaks in the system. If suspected leaks are detected, the controller 26 may include a detector 27 that can monitor the water flow in the system and activate a visual or audible warning (shown) and/or provide data updates to the operator. Using the information supplied to it from these various sensors, the controller 26 will compare the cooling requirements, weather conditions, water temperatures, time of day, and animal condition to control pumps and/or the flow of water to and from the heat exchanger 10. In the systems of FIGS. 1 and 2, the controller 26 also optimizes water usage by controlling the water diverter valves 18, 20 and 22, and pump 24. In the system of FIG. 3, the controller 26 can also interface with the chiller 13 and boiler 15 to control these units depending upon the temperature desired in the heat exchanger 10.

In all the systems, the controller 26 is provided with a digital display 40, a sensor selector 42, a manual output selector 44 and operator controlled programming buttons 46. The controller can also be designed to employ "chiller-reset", time of day, power load shedding techniques, absence of animal sensing, and other future control schemes to optimize the effectiveness and efficiency of the systems of the invention.

Referring now to FIG. 5, there is shown a design for a tube-type heat exchanger suitable for use in the systems of the invention in which the heat exchanger 10 is buried in the animal bedding areas 17. The design allows for flexibility in the use of a stand-alone cooling or heating function, or, a combined cooling and heating function. It will be understood, however, that heat exchangers of any suitable design can be utilized. The heat exchanger 10 has a base 50 to provide proper support for the unit. On each side of the heat exchanger 10 are closed channels 52 and 53. One end of the channel 52 on one side is connected to the water supply line 12. A plurality of tubes 54 extend between the channels 52 and 53 to provide for the flow of the inlet water through the tubes 54. The return line 16 is connected to the channel 53 at the discharge end of the heat exchanger. Thus, water from the supply source 14 or re-circulated warmed or cooled water can be passed though the heat exchanger 10 to cool or warm the bedding area 17. Since the heat exchanger 10 is positioned beneath the bedding area 17 of a rather large animal in an animal confinement building, the heat exchanger 10 must be capable of sustaining the physical weight and impact of 1600-pound animals above it.

In conducting tests of the systems of the invention, suitable sensors (not shown) were applied to the cows to monitor the skin and core body temperatures of the animal. To measure the core body temperature, a probe rectal or vaginal probe is inserted into the cow. The average core body temperature of a cow is 101.5° F. (38.6° C.). A cow's body temperature must be maintained within very narrow limits in order to sustain its physiological processes (profitable milk production and reproductive performance). To measure the skin temperature, an infrared sensor can be used. The ideal skin surface temperature of a high-producing cow is at or below 99° F. If the skin surface temperature of a dairy cow is below 99° F., the temperature gradient between the core and skin is large enough for the cow to use all four routes of heat exchange (evaporation, radiation, conduction, and convection) if favorable environmental conditions exist.

If desired, an additional option in the control system can utilize an "intelligent" algorithm to simulate heat stress on the selected livestock. This feature utilizes a combination of a psychometric chart database for stress conditions on the animals and real-time data updates from additional infrared (IR) thermometers that read the animal's skin and core body temperatures, bedding temperatures and other parameters as needed.

Figure 6:
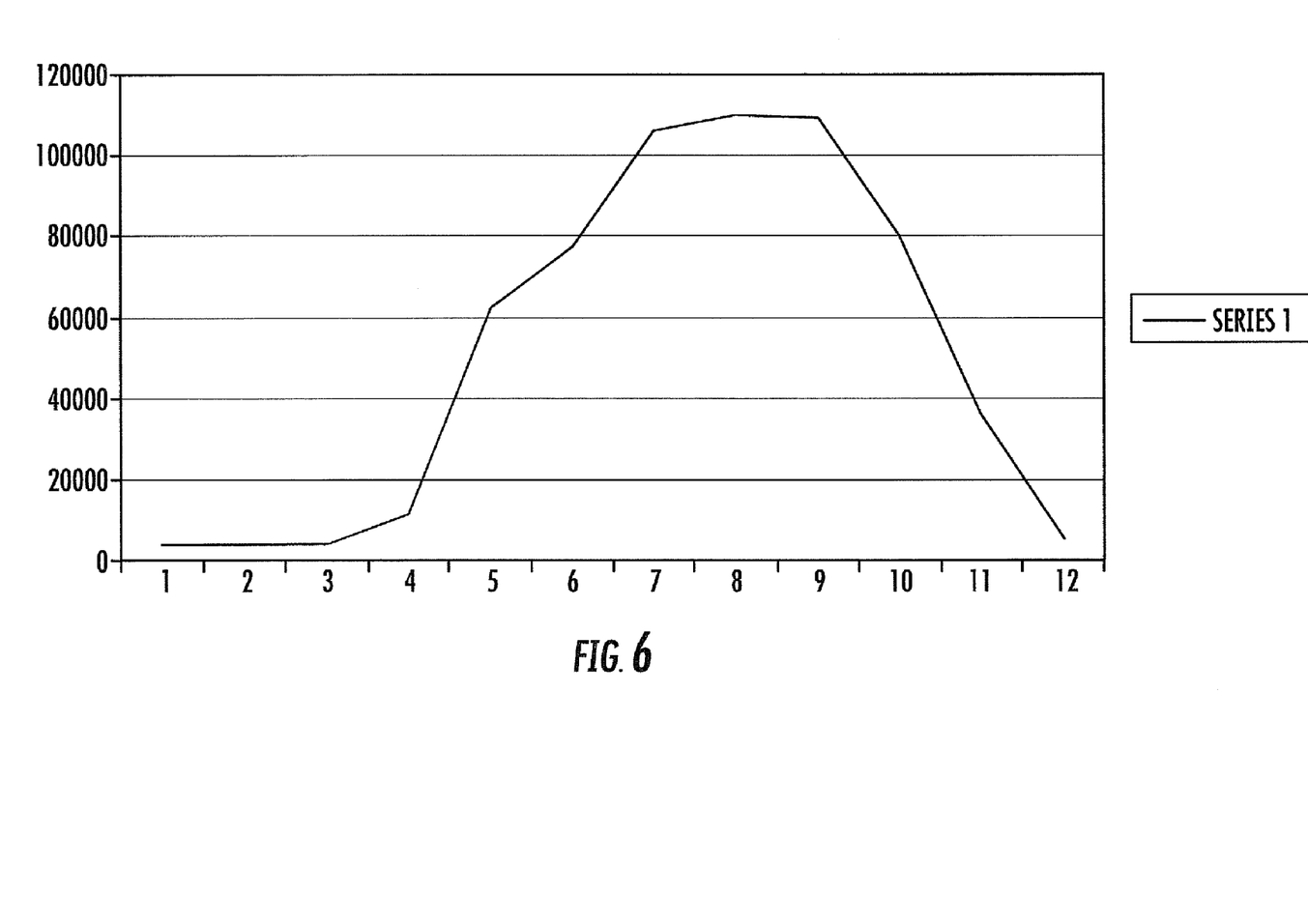
FIG. 6 is a chart showing the actual energy/electricity cost of a dairy operation.
Figure 7:
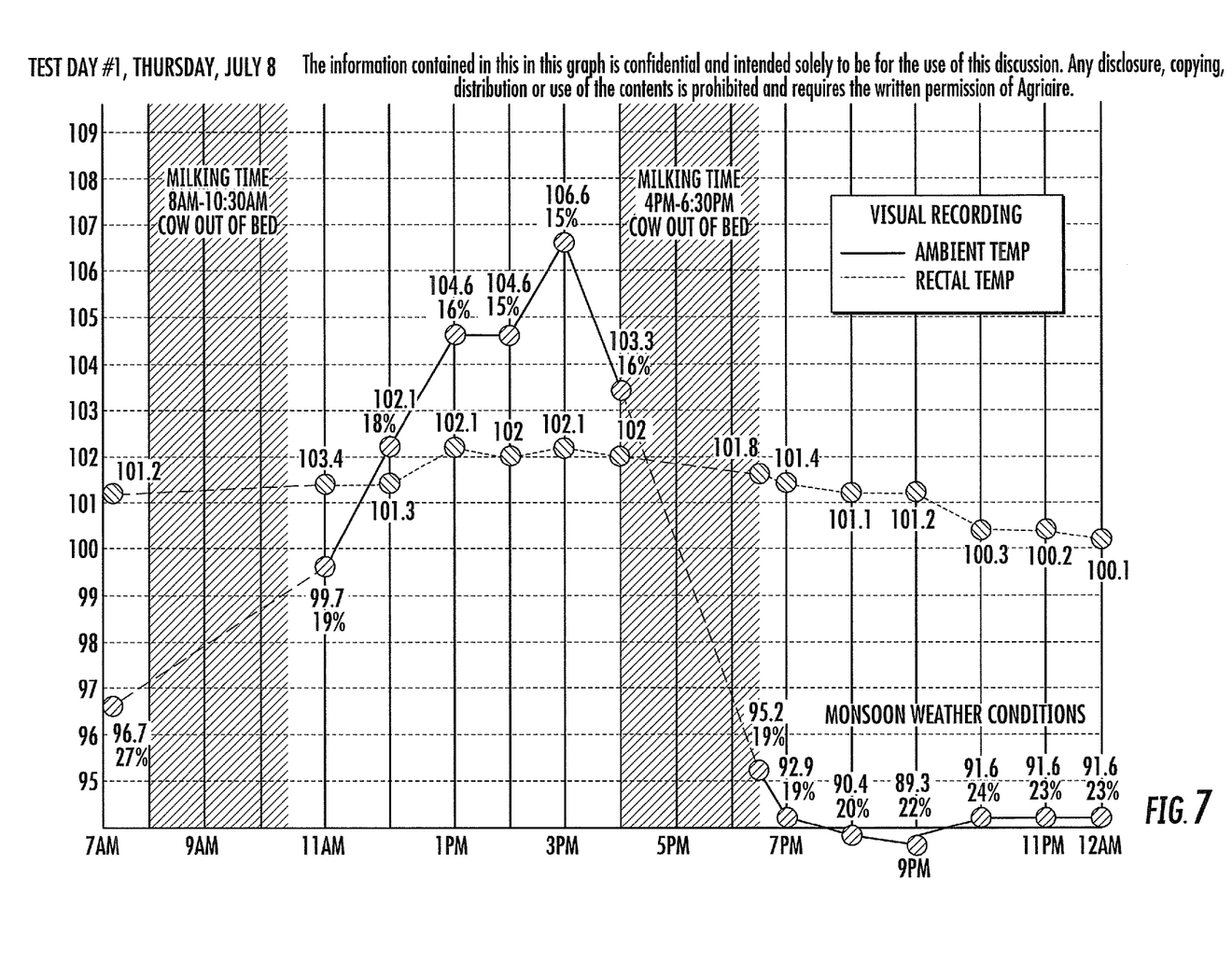
FIG. 7 is a chart illustrating the results of a test conducted on one day during a two-day test on a cow from a dairy operation which used the system of the invention.
Figure 8:
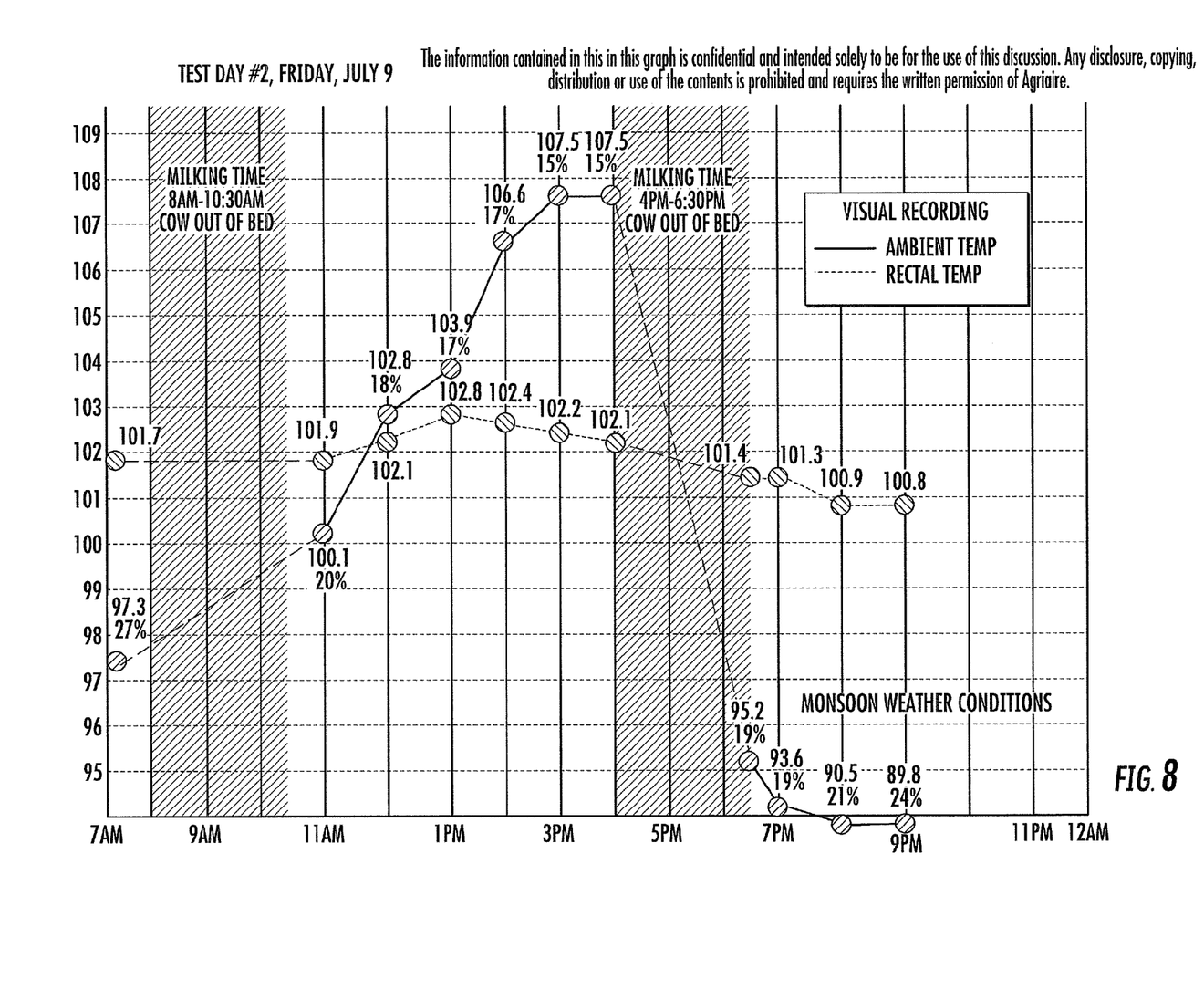
FIGS. 8, 9 and 10 are charts illustrating further results of tests conducted during the two-day test on a cow from a dairy operation which used the system of the invention.
Figure 9:
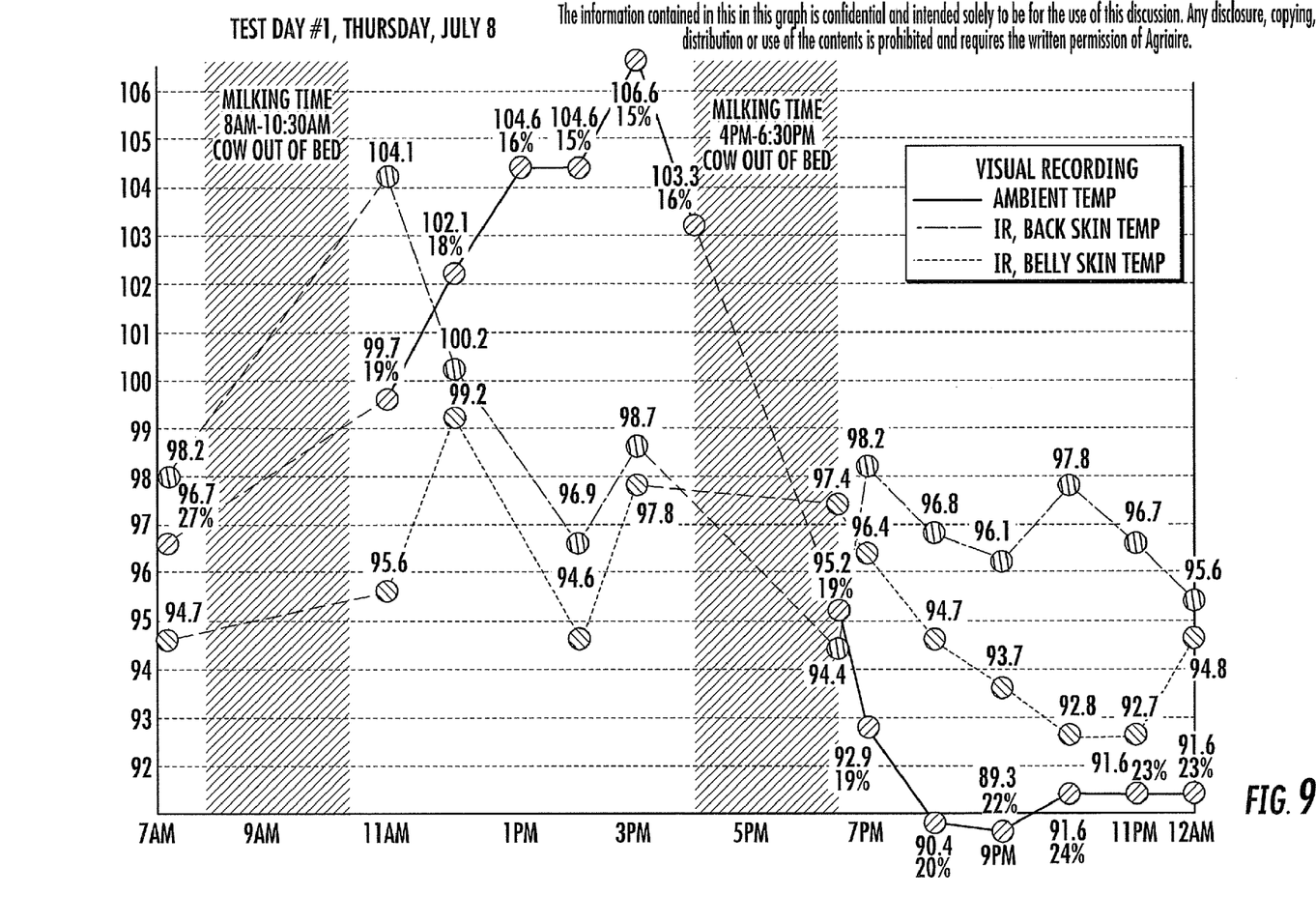
Figure 10:
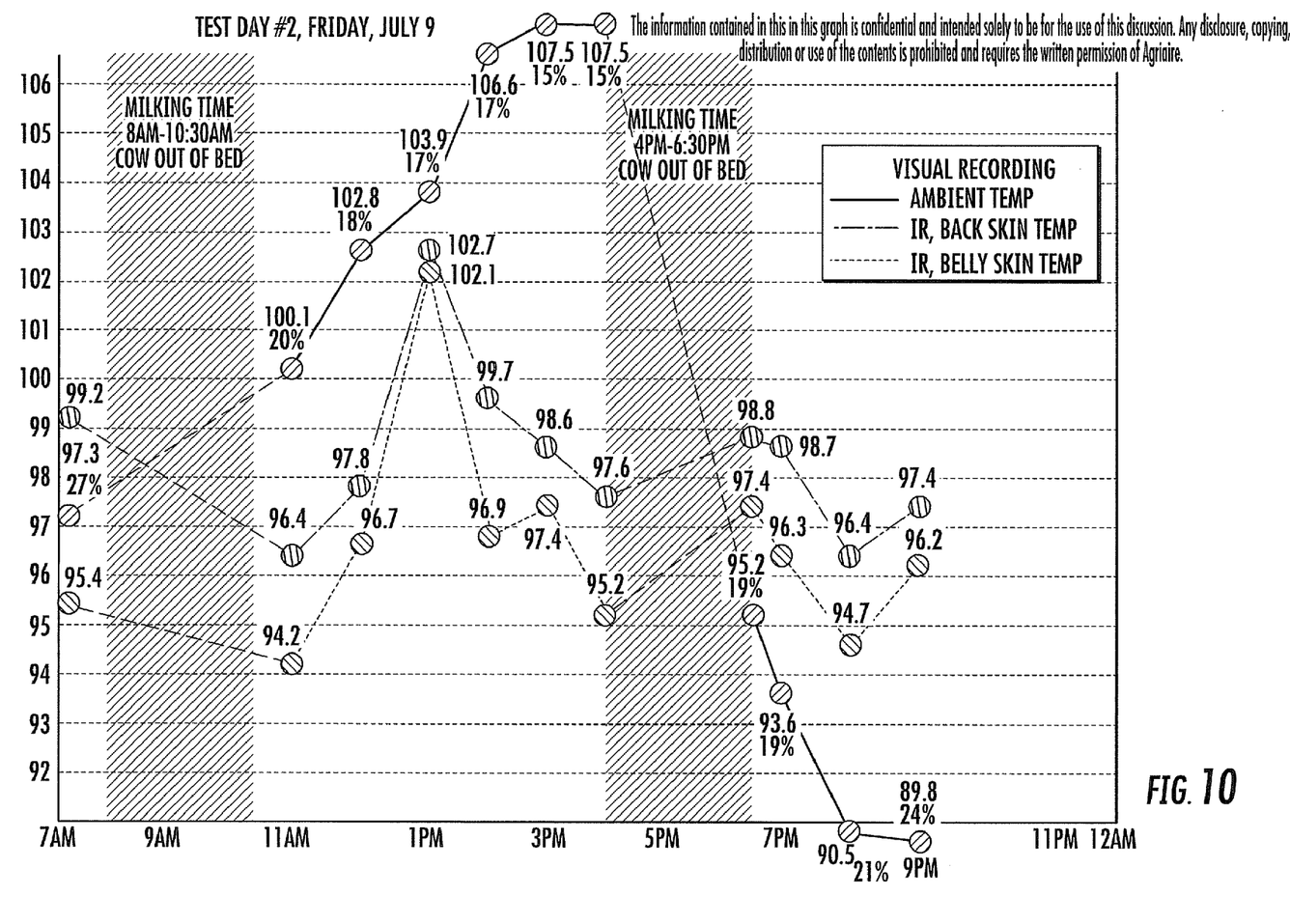

The cooling system and method of the invention can be used in almost any geographic area where the environment includes periods of extended heat and/or humidity. In many of these areas, providing a method for cooling the animals is not an option, it is a requirement. In any event, the energy cost and water usage to cool animals during periods of high heat can have a major impact on the profitability of a farm operation, especially in dairy operations where milk production declines because of the stress on the animals. For example, in states like California, summer time energy costs can be double the winter costs as a result of the cost of operating cooling fans and misting operations. And in states like Arizona, energy costs can be even higher. The chart of FIG. 6 shows the actual energy/electricity cost of a 9,500 cow dairy operation in Arizona.

The chart shows the cost over months 4-10 to be about $700,000 to cool 9,500 cows over the summer months. These costs result from the conventional cooling of dairy cows during the summer months which consumes electricity during the peak hours of the power demand and large quantities of water for various cow soaking and misting systems. By using the cooling capacity of the normal operational (well) water supply of the dairy, the system of the invention will reduce both electricity consumption and water usage by diverting a significant portion of the required animal cooling to a conduction method of cooling.

The fact that conduction is both very effective for heat transfer and the least affected by site environmental conditions, excess thermal energy will be removed from animals via direct contact between the lying animal and the bedding surface, where the bedding is cooled by the buried heat exchangers. The method and system has been "proof-tested", refined, and evaluated by a series of university laboratory studies in a controlled environmental chamber as well as tested on live animals in single and multiple animal testing.

The charts shown in FIGS. 7-10 illustrate the results of tests conducted during two days on a cow from a large dairy operation in Arizona using the system of the invention.

Figure 11:
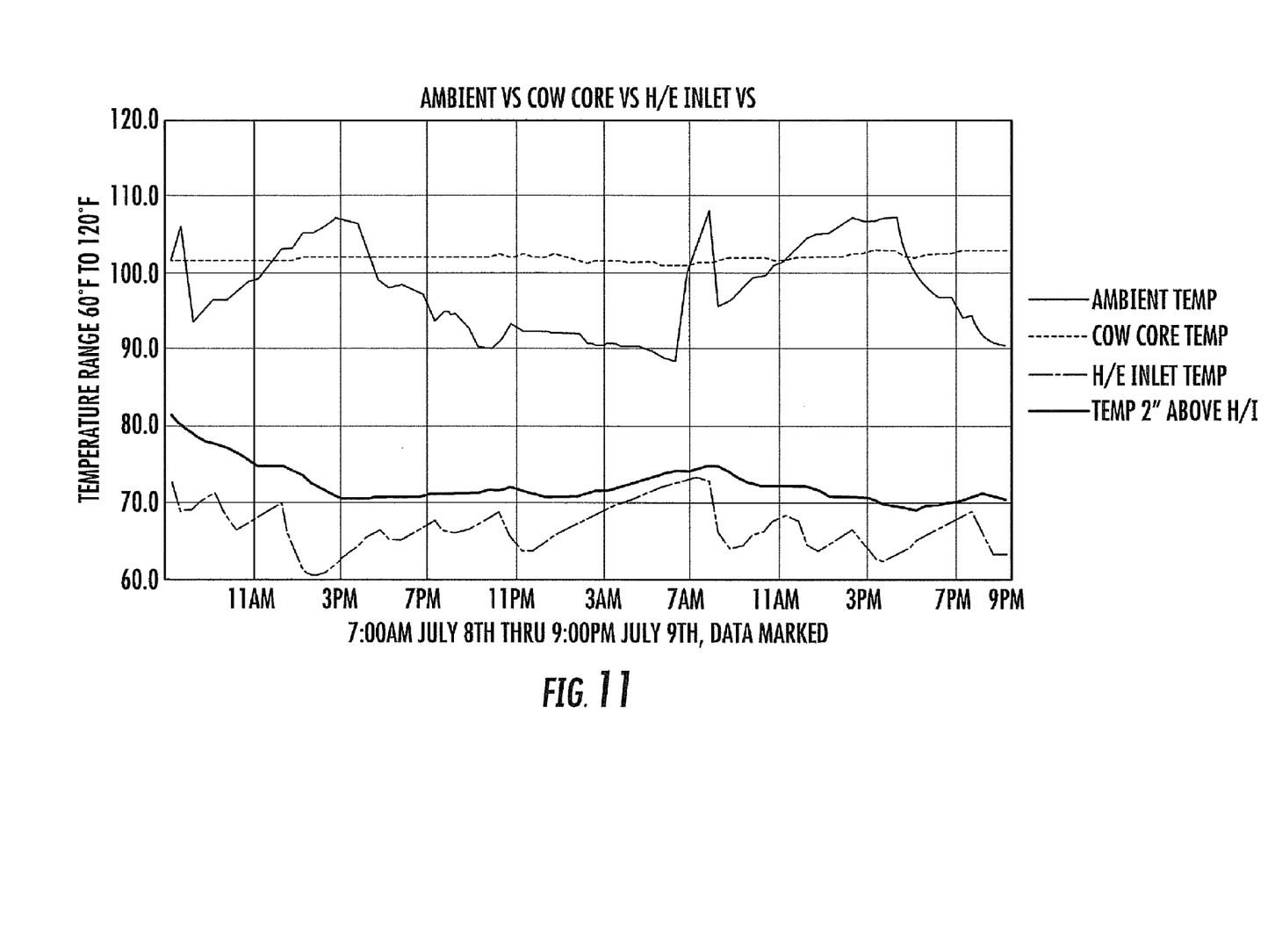
FIG. 11 is a chart summarizing the results of the two days of tests illustrated in FIGS. 7-10.

The chart of FIG. 11 summarizes the results of the two day test illustrated in FIGS. 7-10 and shows the effectiveness of using the conductive cooling system of the invention.

The results of these tests confirmed that thermal conduction cooling utilizing the principles of the invention with simulated well water at a temperature of 61.4-72.7° F. can effectively maintain the internal temperature of a high-producing dairy cow between 100° F. and 103° F. and the skin surface temperature at or under 99° F. under ambient temperatures up to 107.5° F. with a relative humidity of 15%.

Additional testing was conducted over a 30 day period in a commercial dairy operation during which the ambient air temperature was in the low to upper 90s. In these tests, the principles of the invention using only conductive cooling were applied to a group of 52 test cows while 150 control cows were cooled using feed lane soakers and cooling fans. The testing showed that that was no significant difference in milk production between the two test groups but there was a significant saving of up to 75% in energy cost and water usage.

Considerable effort has been expended to validate the physiological attributes of conductive cooling, such as core temperature maintenance, skin temperature maintenance, biological function (milk production), and overall animal well-being. In the testing that has been conducted, the surface contact area of the subject animal was determined, the internal blood flow rates were evaluated, and the impact of the animals normal daily routine of feeding, milking, and outside activity were accounted for in the development of the conductive cooling design. A number of heat exchanger configurations, cooling water flow rates, temperature differentials, and material details have been evaluated for their optimization in providing the removal of excess core temperature and energy beyond that available from the other natural cooling processes.

It is also possible to reverse the process by providing naturally warm water or auxiliary heated water in cold weather to protect the efficient utilization of feed by the animal for desired growth or product production in lieu of simply maintaining body temperature. In calf operations, more calves are lost to cold weather than hot weather. Systems for accomplishing the supply of warmth are illustrated in the embodiments of the invention shown in FIGS. 2 and 3.

Consideration has been given to the robustness of the system such that it can sustain the physical impacts of 1600-pound animals above it, compensate for temperature variations, and allow for system down-time. The characteristics of the conductive cooling system demonstrate an ability to operate without the input of cooling liquids for periods of time that would not be available when conventional evaporative or fan systems are down due to power outage or other failure.

Both sand and compost bedding systems, for cows, have been evaluated. Testing and design considerations have been made for adaption of the conductive cooling concept to both free-stall and loafing area types of cow confinement (Saudi barns). Engineering review has been made for application to "water-bed" type of bedding systems and there are no constraints to prevent use of the invention with this system of bedding.

Where the ambient conditions and/or the groundwater temperatures either exceed the capacity of the system to provide effective cooling or are basically not available, additional cooling may be required. These conditions exist, for example, in areas such as Arizona with its high groundwater temperatures and months of air temperatures that exceed 90° F. Recent engineering studies support the conclusion that mechanical refrigeration can be an effective alternate to conventional evaporative systems, both in arid climates, and more so, in tropical climates. Using the system of the invention illustrated in FIG. 3, the mechanical cooling of the water can be more energy efficient than the use of conventional fans and pumping costs for evaporation water. Other approaches to the mechanical cooling process might be utilization of waste thermal energy from emerging farm processes to supply virtually free cooling via heat based absorption chillers.

The concept of conductive cooling for confined animals is a logical approach that avoids the limitations of evaporative and convective fan systems. It can be made very effective for a range of applications by the use of well known engineering principles from conventional chiller design. Furthermore, in areas with limited water supplies for evaporative systems, the economics are very compelling, especially in consideration of the dwindling supply of potable water. The conduction cooling method of the invention will provide the livestock producer with a cost-effective opportunity to minimize the significant economic impacts they realize during the summer months. This cost reduction results from minimizing or totally eliminating electric power consumption for cooling fans as well as reducing the pumping requirements from the reduction of associated water usage. Of significance, the methods and systems of the invention are a significant advance over prior applications where tubes were placed in flooring to heat and cool the flooring by radiation. These prior systems showed poor performance due to the fact that cooling by absorption of radiated energy from warm objects above the floor and not in direct contact with the floor (as is the case with conduction cooling) is extremely low. Our invention utilizing conduction cooling and heating overcomes the limitations of convection and radiation pathways for heat transfer to a cooled floor or surface.

Having thus described the invention in connection with the preferred embodiments thereof, it will be evident to those skilled in the art that various revisions can be made to the preferred embodiments described herein without departing from the spirit and scope of the invention. It is our intention, however, that all such revisions and modifications that are evident to those skilled in the art will be included within the scope of the following claims.

We claim:

1. A method for the conductive cooling or heating of dairy animals in a farm operation having a water supply and in which the dairy animals are housed in a housing structure that includes an enclosure confining the animals in a housing area and having a floor, the method comprising:
   providing a layer of soft bedding materials extending over substantially the entire floor of the housing area to provide a bedding area to cushion the animals;
   providing a first heat exchanger beneath and in direct contact with the bedding materials, which first heat exchanger extends beneath substantially the entire bedding area;
   supplying water from the water supply through a supply line to the first heat exchanger;
   circulating the water in the supply line through the first heat exchanger and then through a return line;
   monitoring the temperature of the water flowing in the supply line;
   monitoring the temperature of the water flowing in the return line; and
   controlling the flow of water through the first heat exchanger in response to the temperature of the water in the supply line and in the return line.

2. The method of claim 1 including the additional step of monitoring the ambient air temperature in the housing area, and the flow of water through the first heat exchanger is monitored in response to the temperature of the water in the supply line and in the return line and the ambient air temperature in the housing area.

3. The method of claim 2 including the additional step of monitoring the relative humidity of the air in the housing area, and the flow of water through the first heat exchanger is monitored in response to the temperature of the water in the supply line and in the return line and the ambient air temperature and relative humidity in the housing area.

4. The method of claim 1 in which the water circulated through the first heat exchanger is returned through the return line to the water supply.

5. The method of claim 4 in which the water returned to the water supply is used for other uses in the farm operation.

6. The method of claim 1 in which the water from the water supply is circulated through a second heat exchanger, the water in the supply line is circulated through the first heat exchanger and then through the return line back to the second heat exchanger.

7. The method of claim 6 in which the water from the water supply circulated through the second heat exchanger is returned through the return line to the water supply.

8. The method of claim 1 in which the water in the return line is returned to the supply line, and a chiller and a boiler are located in the supply line to heat or cool the water to a desired temperature before entering the first heat exchanger.

9. A system for the conductive cooling or heating of dairy animals in a farm structure having a water supply and in which the animals are housed in a confined housing area having a floor, the system comprising:
   a layer of soft bedding materials extending over substantially the entire floor of the housing area to provide a bedding area to cushion the animals;
   a first heat exchanger located beneath and in direct contact with the bedding materials, which first heat exchanger extends beneath substantially the entire bedding area;
   a supply line to the first heat exchanger for supplying water from the water supply to the first heat exchanger;
   a return line from the first heat exchanger for returning water from the first heat exchanger;
   a first sensor for monitoring the temperature of the water in the supply line; and
   a second sensor for monitoring the temperature of the water in the return line;
   the flow of water through the supply line being controlled in response to the temperature of the water in the supply line and in the return line.

10. The system of claim 9 in which the flow of water through the supply line being controlled in response to the temperature of the water in the supply line and in the return line is by a controller operatively connected to the first and second sensors.

11. The system of claim 10 in which there is a third sensor for monitoring the ambient air temperature in the housing area; and the third sensor is operatively connected to the controller, which controller controls the flow of water through the supply line in response the temperature of the water in the supply line, the return line and the ambient air temperature in the housing area.

12. The system of claim 11 in which there is a fourth sensor for monitoring the relative humidity of the air temperature in the housing area; and the fourth sensor is operatively connected to the controller, which controller controls the flow of water through the supply line in response the temperature of the water in the supply line and the return line and the relative humidity and ambient air temperature in the housing area.

13. The system of claim 12 in which there is a second heat exchanger located in the supply line and the return line for heating or cooling the water flowing into the first heat exchanger.

14. The system of claim 12 in which the water in the return line is returned from the first heat exchanger back into the supply line.

15. The system of claim 9 in which there is a second heat exchanger located in the supply line and the return line for heating or cooling the water flowing into the first heat exchanger.

16. The system of claim 9 in which the water in the return line is returned from the first heat exchanger back into the supply line.

17. The system of claim 16 in which the water in the return line is returned from the first heat exchanger back into the supply line, and a cooler is provided in the return line.

18. The system of claim 16 in which the water in the return line is returned from the first heat exchanger back into the supply line, and a heater is provided in the return line.

19. The system of claim 16 in which the water in the return line is returned from the first heat exchanger back into the supply line, and both a cooler and a heater are provided in the return line.

20. The system of claim 9 in which the return line returns the water from the first heat exchanger back to the water supply.

21. A system for the conductive cooling or heating of dairy animals in a farm structure in which the animals are housed in a confined housing area having a floor, the system comprising:
a layer of bedding materials extending over substantially the entire floor of the housing area to provide a bedding area to cushion the animals;
a heat exchanger located beneath and in direct contact with the bedding materials, which heat exchanger extends beneath substantially the entire bedding area;
a supply line to the heat exchanger for supplying liquid to the heat exchanger;
a return line from the heat exchanger for returning the liquid from the heat exchanger;
a first sensor for monitoring the temperature of the liquid in the supply line;
a second sensor for monitoring the temperature of the liquid in the return line; and
the flow of liquid through the supply line being controlled in response to the temperature of the liquid in the supply line and in the return line,
the flow of liquid through the supply line being controlled in response to the temperature of the liquid in the supply line and in the return line.

22. The system of claim 21 in which the liquid in the return line is returned from the heat exchanger back into the supply line, and a cooler is provided in the return line.

23. The system of claim 21 in which the liquid in the return line is returned from the heat exchanger back into the supply line, and a heater is provided in the return line.

24. The system of claim 21 in which the liquid in the return line is returned from the heat exchanger back into the supply line, and both a cooler and a heater are provided in the return line.

* * * * *